(12) United States Patent
Malecha et al.

(10) Patent No.: US 11,299,278 B1
(45) Date of Patent: Apr. 12, 2022

(54) DRESS COVER FOR EXPENDABLE CUSHION

(71) Applicant: B/E Aerospace, Inc., Winston-Salem, NC (US)

(72) Inventors: Jeremy F. Malecha, Pfafftown, NC (US); Lazaro Martinez, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/198,018

(22) Filed: Mar. 10, 2021

(51) Int. Cl.
B64D 11/06 (2006.01)

(52) U.S. Cl.
CPC ...... B64D 11/0641 (2014.12); B64D 11/0647 (2014.12)

(58) Field of Classification Search
CPC .......................... B64D 11/0641; B64D 11/0647
USPC ..................................................... 297/284.11
See application file for complete search history.

(56) References Cited

U.S. PATENT DOCUMENTS

| 6,272,701 | B1 | 8/2001 | Zafiroglu | |
|---|---|---|---|---|
| 6,883,193 | B2 | 4/2005 | Brooks et al. | |
| 6,936,327 | B2* | 8/2005 | Zafiroglu | ................. B32B 7/12 428/92 |
| 8,021,735 | B2 | 9/2011 | Tsiarkezos | |
| 10,045,631 | B2 | 8/2018 | Tiffany | |
| 10,703,225 | B2* | 7/2020 | Ito | ............................. B60N 2/99 |
| 2008/0166520 | A1* | 7/2008 | Zafiroglu | .................. B32B 7/08 428/136 |
| 2009/0106906 | A1* | 4/2009 | Soltani | ................. A61G 7/0755 5/713 |
| 2013/0320730 | A1* | 12/2013 | Aselage | ............... B60N 2/0284 297/337 |
| 2016/0288680 | A1* | 10/2016 | Kolich | ................. B60N 2/0296 |
| 2019/0281992 | A1 | 9/2019 | James | |
| 2019/0307260 | A1* | 10/2019 | Bain | ...................... A47C 7/021 |
| 2020/0375369 | A1 | 12/2020 | Negus et al. | |
| 2021/0114496 | A1* | 4/2021 | Tait | ......................... B60N 2/914 |

FOREIGN PATENT DOCUMENTS

| EP | 1946679 A1 | 7/2008 |
|---|---|---|
| GB | 2508189 A | 5/2014 |

* cited by examiner

Primary Examiner — Mark R Wendell
(74) Attorney, Agent, or Firm — Suiter Swantz pc llo

(57) ABSTRACT

A dress cover for an extendable cushion may include a first section and at least a second section. The first section may be fabricated from a first, expandable material and the at least a second section may be fabricated from at least a second material. The first section may include a compressed top surface length when the extendable cushion is in a retracted state, and an expanded top surface length when the extendable cushion is in an extended state. The expanded top surface length may be greater than the compressed top surface length. The dress cover may be configured to have a smooth side profile when the extendable cushion is in either of the retracted state or the extended state. The side profile of the dress cover may be viewable when an aircraft seat including the extendable cushion with the dress cover is in a lie-flat or bed position.

12 Claims, 12 Drawing Sheets

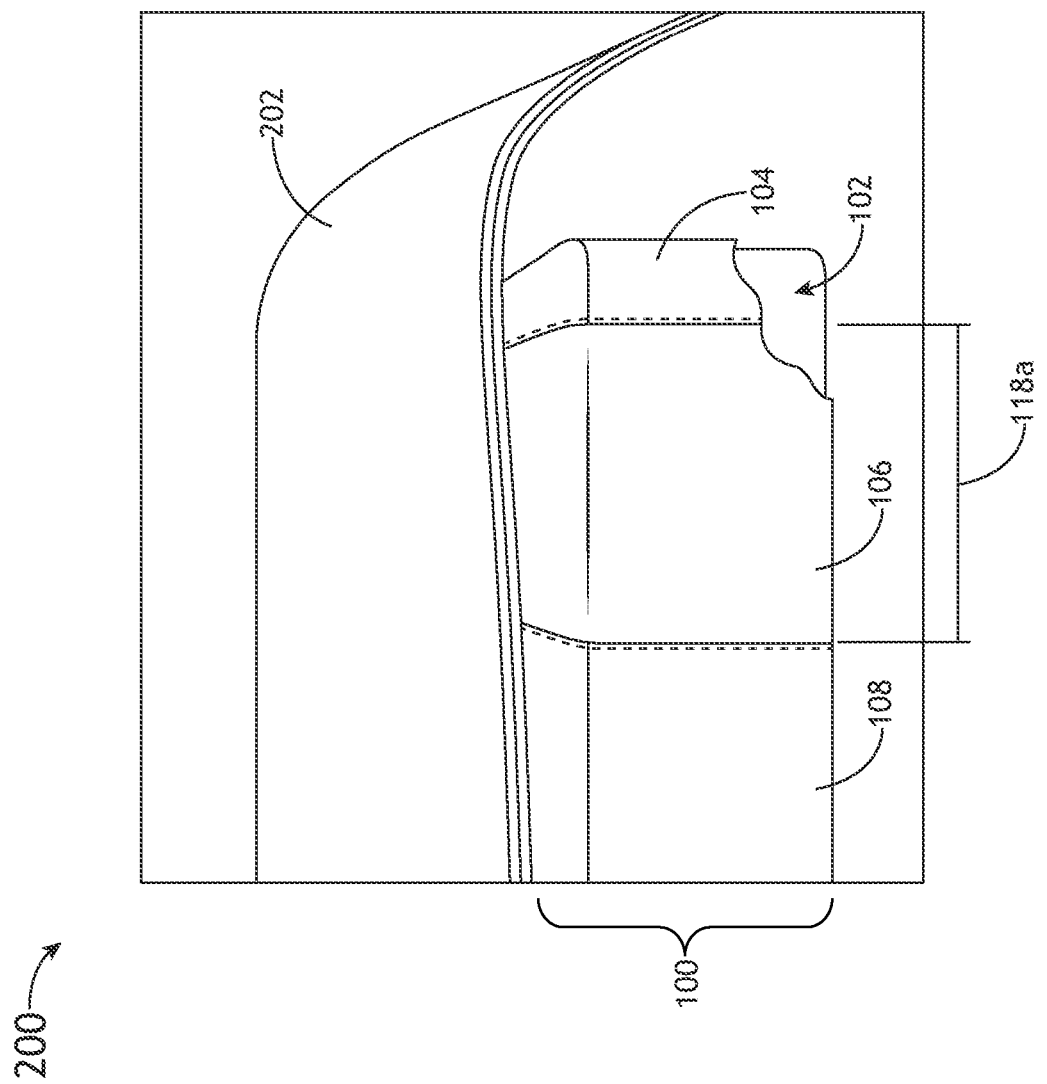

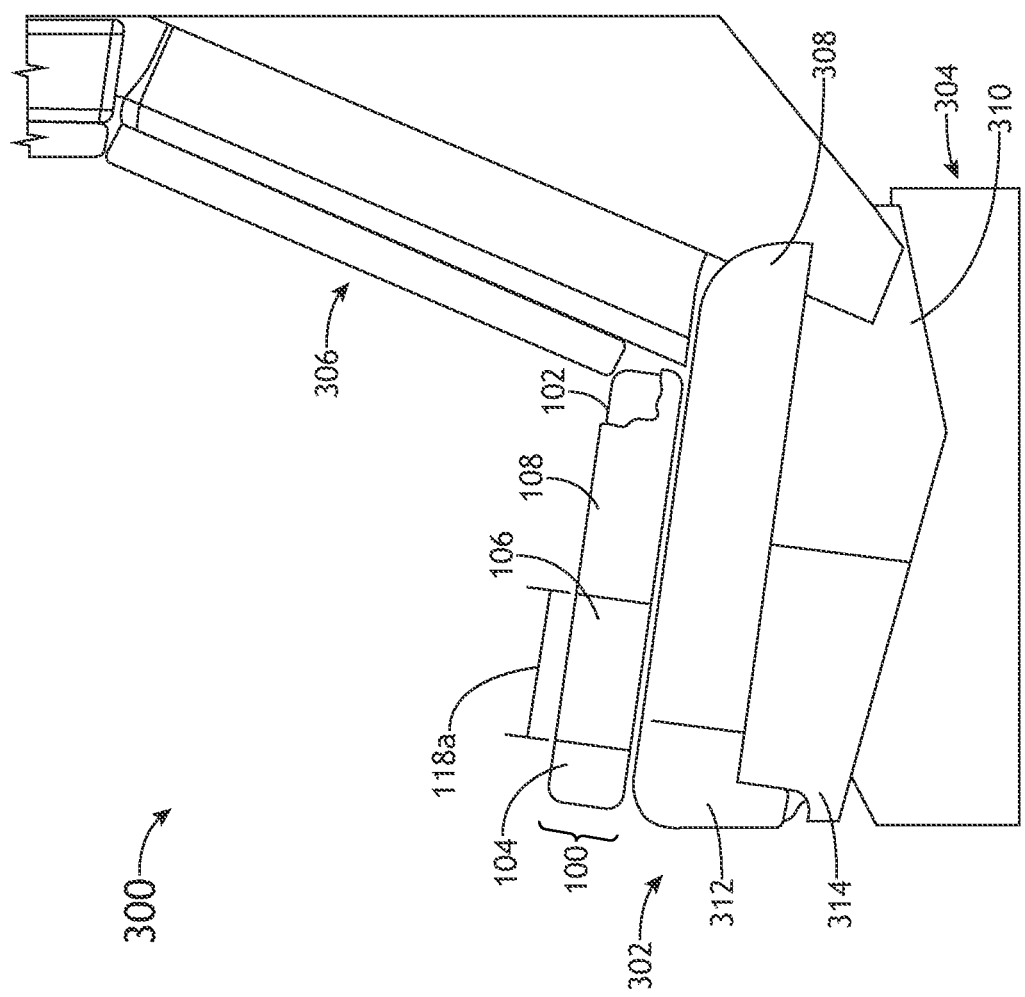

DRESS COVER FOR EXPENDABLE CUSHION

BACKGROUND

Aircraft seats may include components such as a cushion and a dress cover. The cushion may be a single cushion, or may include a primary cushion and one or more auxiliary cushions. The dress cover may cover the one or multiple components of the cushion as a whole (e.g., a single dress cover) or separately (e.g., a section of dress cover per component of the cushion). During the actuation of the cushion, the dress cover (or dress covers) may stretch or bunch up, resulting in an uncomfortable and/or less-than-attractive aircraft seat appearance.

SUMMARY

A dress cover for an extendable cushion is disclosed, in accordance with one or more embodiments of the disclosure. The dress cover may include a first section and at least a second section. The first section may be fabricated from a first, expandable material and the at least a second section may be fabricated from at least a second material. The first section may include a compressed top surface length when the extendable cushion is in a retracted state. The first section may include an expanded top surface length when the extendable cushion is in an extended state. The expanded top surface length may be greater than the compressed top surface length. The dress cover may be configured to have a smooth side profile when the extendable cushion is in either of the retracted state or the extended state. The side profile of the dress cover may be viewable when an aircraft seat including the extendable cushion with the dress cover is in a lie-flat or bed position.

In some embodiments, the dress cover may be configured to retain the smooth side profile when the extendable cushion transitions between the retracted state and the extended state.

In some embodiments, the at least a second material being at least one non-expandable material.

In some embodiments, the at least a second section may include a second section and a third section. The first section may be positioned between the second section and the third section.

In some embodiments, the second section may be fabricated from a first non-expandable material and the third section may be fabricated from a second, different non-expandable material.

In some embodiments, the non-expandable material from which the second section and the third section are fabricated may be the same.

In some embodiments, the first section may be fabricated from the first, expandable material and the at least a second section may be fabricated from at least a second, expandable material. The first, expandable material may have a first elasticity. The second, expandable material may have a second, different elasticity.

In some embodiments, the first, expandable material and the at least a second material of the dress cover may be rated to pass flame tests for aircraft cabin interior installations as set forth by aviation guidelines or standards.

In some embodiments, the first section and the at least a second section may be joined together via a seam produced with one or more attachment procedures. The one or more attachment procedures may be rated to pass flame tests for aircraft cabin interior installations as set forth by aviation guidelines or standards.

In some embodiments, the seam may be non-accessible when the dress cover is installed on the extendable cushion.

In some embodiments, the dress cover may be configured to wrap-around at least one of an edge, side surface, or bottom surface of the extendable cushion when installed on the extendable cushion.

In some embodiments, the dress cover may be installed on the extendable cushion when the extendable cushion is in the retracted state.

In some embodiments, a top surface of the dress cover may be protected by a removable cover. The removable cover may include at least one section fabricated from at least one material. The at least one material of the at least one section of the removable cover may be rated to pass flame tests for aircraft cabin interior installations as set forth by aviation guidelines or standards.

In some embodiments, the extendable cushion may be positioned on a seat pan of the aircraft seat. The extendable cushion may be configured to actuate with at least a section of the seat pan.

An aircraft seat is disclosed, in accordance with one or more embodiments of the disclosure. The aircraft seat may include a seat pan. The aircraft seat may include an extendable cushion positioned on the seat pan. The extendable cushion may be configured to actuate with at least a section of the seat pan. The aircraft seat may include a dress cover installed on the extendable cushion. The dress cover may include a first section and at least a second section. The first section may be fabricated from a first, expandable material and the at least a second section may be fabricated from at least a second material. The first section may include a compressed top surface length when the extendable cushion is in a retracted state. The first section may include an expanded top surface length when the extendable cushion is in an extended state. The expanded top surface length may be greater than the compressed top surface length. The dress cover may be configured to have a smooth side profile when the extendable cushion is in either of the retracted state or the extended state. The side profile of the dress cover may be viewable when an aircraft seat including the extendable cushion with the dress cover is in a lie-flat or bed position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2B illustrates a side-profile view of portions of an extendable cushion including a dress cover, in accordance with one or more embodiments of the disclosure;

FIG. 3A illustrates a side-profile view of an aircraft seat including an extendable cushion with a dress cover, in accordance with one or more embodiments of the disclosure;

DETAILED DESCRIPTION OF THE INVENTION

Figure 1A:
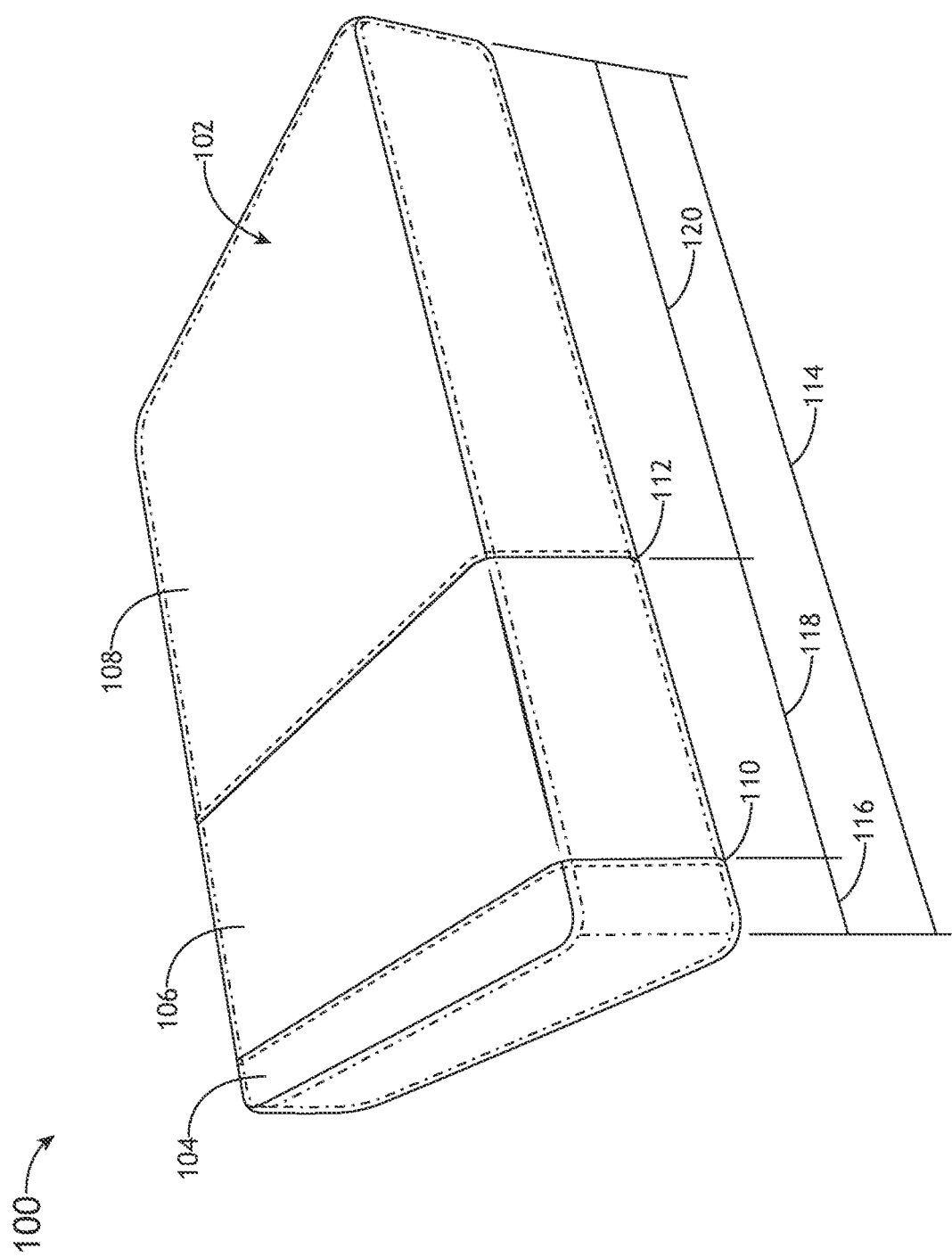
FIG. 1A illustrates a perspective view of an extendable cushion including a dress cover, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-4D generally illustrate a dress cover for an extendable cushion, in accordance with one or more embodiments of the disclosure.

Aircraft seats may include components such as a cushion and a dress cover. The cushion may be a single cushion, or may include a primary cushion and one or more auxiliary cushions. The one or more auxiliary cushions may be configured to actuate to provide additional adjustment for an occupant. For example, the aircraft seat may include a set of air bladders, slides, rotating cams, or the like. For instance, the set of air bladders may extend an auxiliary cushion outward or retract the auxiliary cushion inward. By way of another example, the slides may translate the auxiliary cushion inward or outward, potentially leaving a void between the primary cushion and the auxiliary cushion. By way of another example, the rotating cams may rotate an auxiliary cushion about an axis, increasing a length of the cushion when the auxiliary cushion is in a first position and decreasing a length of the cushion when the auxiliary cushion is in a second position.

The dress cover may cover the one or multiple components of the cushion as a whole (e.g., a single dress cover) or separately (e.g., a section of dress cover per component of the cushion). Installing the multiple dress covers on the aircraft seat may require taking the interfacing between the multiple dress covers into consideration. For example, improper interfacing may create issues such as, but not limited to, cleanliness due to increased gaps (e.g., trash or debris falling in the void or between the airbags), reduction of cushion thickness, or the like.

During the actuation of the cushion, the dress cover (or dress covers) may stretch or bunch up, resulting in an uncomfortable and/or less-than-attractive aircraft seat appearance. The dress cover stretching and/or bunching up may result in a less-than-attractive aircraft seat appearance (e.g., as viewed from a top profile or a side profile, the side profile being viewable when the aircraft seat is in a lounge or bed position). For example, improperly-fitted dress covers may be messier and have more lines.

In select industries the build of the aircraft seat (and any included components within the build) may be required to meet guidelines and/or standards. The aircraft seat may be required to meet aviation guidelines and/or standards. For example, the aircraft seat may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For instance, the aircraft seat and/or its components may be required to meet and/or exceed flame tests as set forth by the aviation guidelines and/or standards.

As such, it would be desirable to create a dress cover that addresses the shortcomings provided above.

Embodiments of the present disclosure are directed to a dress cover for an extendable cushion. Embodiments of the present disclosure are also directed to installing the dress cover on the cushion. Embodiments of the present disclosure are also directed to the dress cover being capable of expanding or compressing with the movement of the cushion. Embodiments of the present disclosure are also directed to the dress cover being protected by a secondary, removable cover.

FIG. 1 illustrates a dress cover 100, in accordance with one or more embodiments of the present disclosure.

In one embodiment, the dress cover 100 is manufactured from one or more sections. In general, the dress cover 100 may be fabricated from 1, 2 . . . up to an N number of sections. Where there are multiple sections, each section has a section top surface length that forms a percentage of a cover top surface length of the dress cover 100. Where there are multiple sections, adjacent sections may be joined together. For example, the adjacent sections may be joined together via sewing, a fabric adhesive, or the like.

Figure 1B:
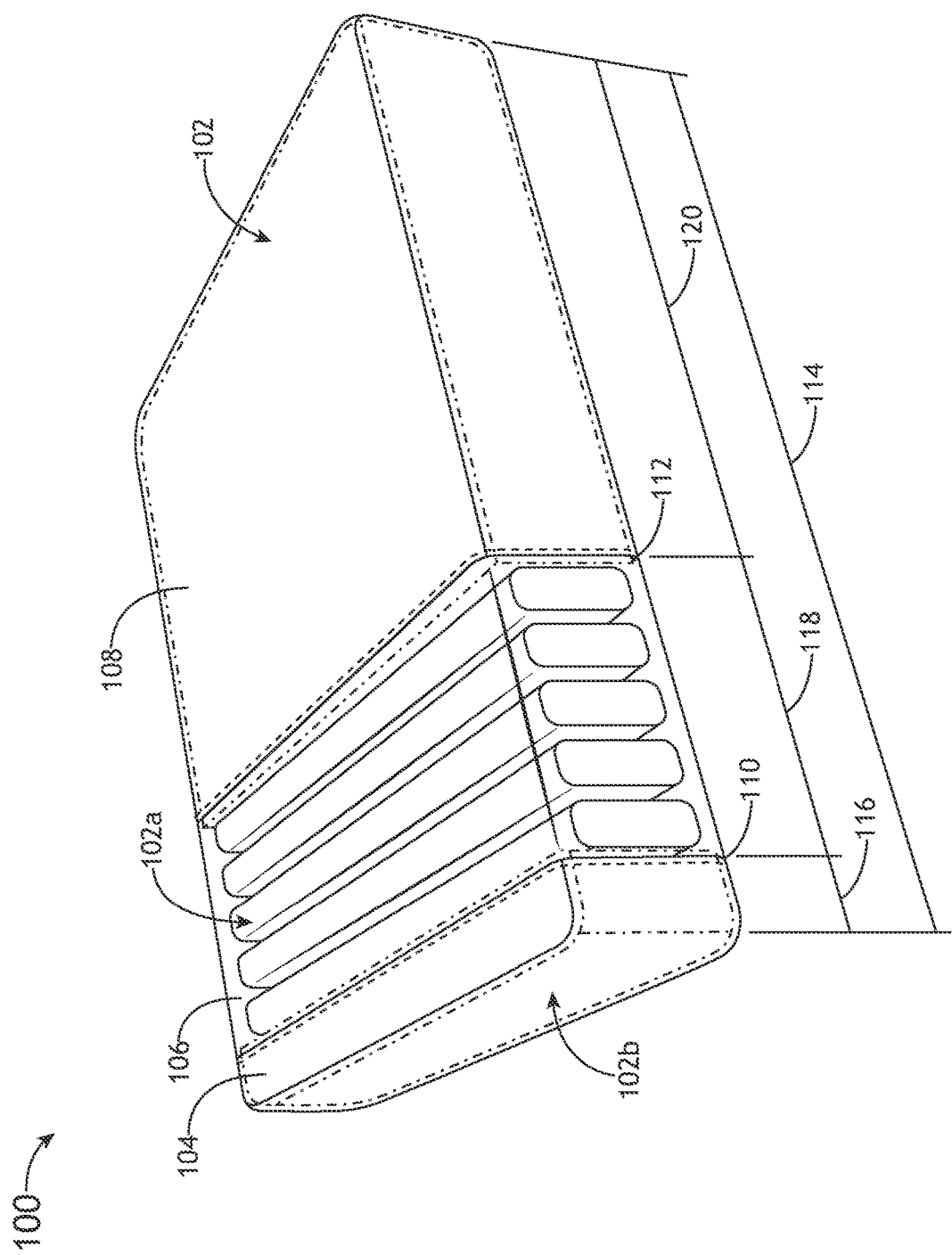
FIG. 1B illustrates a perspective view of an extendable cushion including a dress cover, in accordance with one or more embodiments of the disclosure.
Figure 1C:
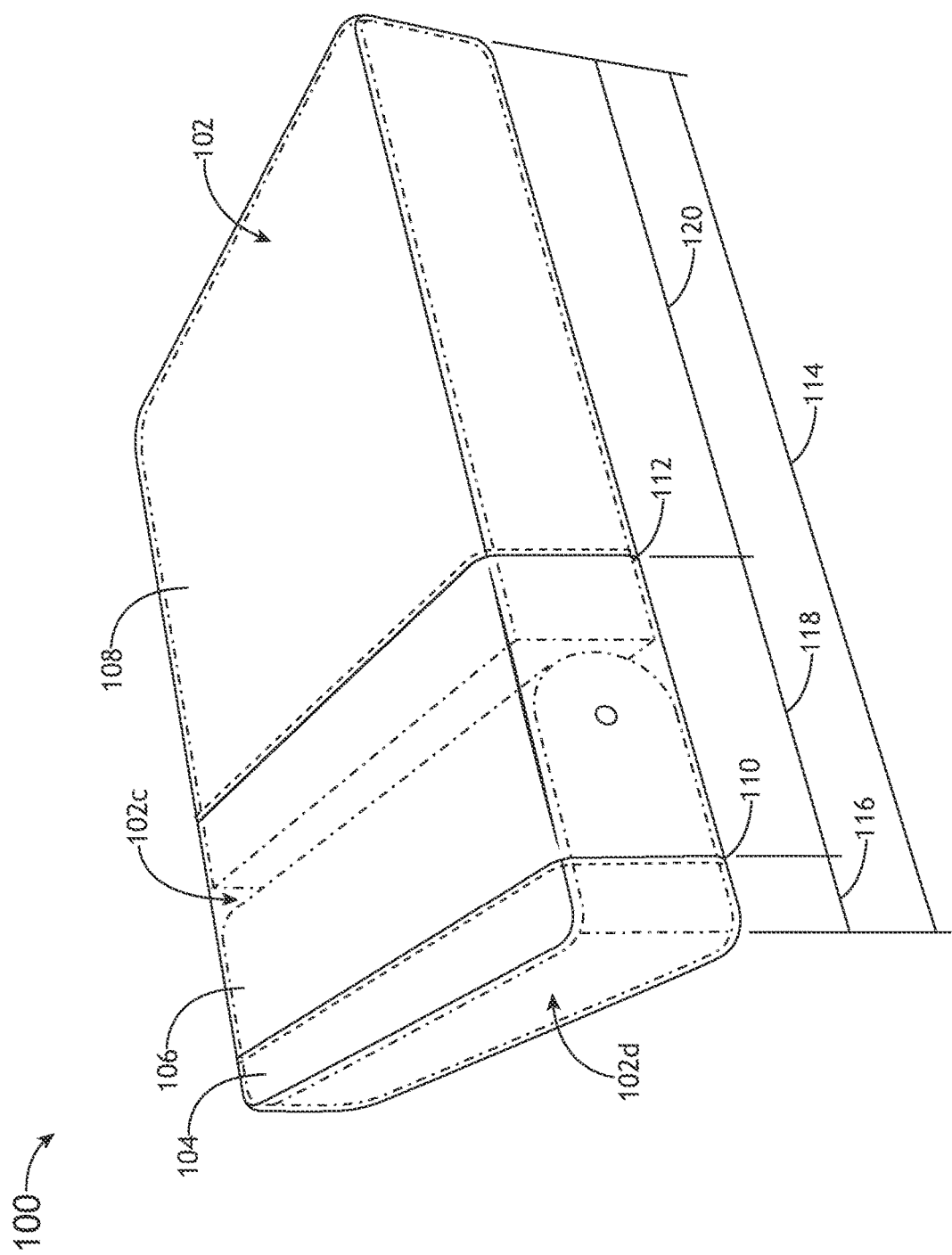
FIG. 1C illustrates a perspective view of an extendable cushion including a dress cover, in accordance with one or more embodiments of the disclosure.

Although a joining location is illustrated in FIGS. 1A-1C, it is noted herein the joining location is shown only for purposes of clarity and that the joining location may be hidden on the dress cover 100 (e.g., non-accessible when the dress cover 100 is installed on the cushion 102) for purposes of preventing access to the joining location, cleanliness of design, meeting aviation guidelines and/or standards, or the like.

In another embodiment, the one or more sections of the dress cover 100 may be fabricated from a same type and/or pattern of material or a different type and/or pattern of material. For example, at least some of the sections of the dress cover 100 may be fabricated from different types of material. By way of another example, all sections of the dress cover 100 may be fabricated from a different type and/or pattern of material. By way of another example, all sections of the dress cover 100 may be fabricated from a same type and/or pattern of material.

The one or more sections of the dress cover 100 may be fabricated from a material that is non-expandable and/or non-compressible (e.g., beyond the natural movement of the material structure or fabric weave). Where multiple sections of the dress cover 100 are fabricated from a material that is non-expandable and/or non-compressible, a first section may be fabricated from a first material and at least a second section may be fabricated from at least a second, different material. It is noted herein, however, the multiple sections of the dress cover 100 may be fabricated from a same material.

The one or more sections of the dress cover 100 may be fabricated from a material that is capable of expansion (e.g., via stretching) and/or compression. For example, the material may include, but is not limited to, a synthetic fiber such as Spandex, Lycra, elastane, or the like. Where multiple sections of the dress cover 100 are fabricated from a material capable of expansion and/or compression, a first section may be fabricated from a first material with a first elasticity and at least a second section may be fabricated from at least a second material with at least a second, different elasticity. It is noted herein, however, the multiple sections of the dress cover 100 may be fabricated from a material and/or compression with a same elasticity.

Where the dress cover 100 includes multiple sections, the sections may be fabricated from a combination of materials that are non-expandable and/or non-compressible, and materials capable of expansion and/or compression.

Where the dress cover 100 is installed on an aircraft seat (e.g., aircraft seat 300, as described throughout the present disclosure), the type (or types) of material from which the one or more sections of the dress cover 100 may be fabricated are configured to meet aviation guidelines and/or standards. For example, the dress cover 100 may be rated to pass flame requirement tests for aircraft cabin interior installations (e.g., structures or components) such as seat cushions as set forth by the aviation guidelines and/or standards under 14 C.F.R. Part 25 and its Appendices (e.g., 14 C.F.R. § 25.853, also found in FAA Advisory Circular (AC) 25.853-1), or the like. For instance, where the dress cover 100 includes multiple sections, the multiple sections may be joined together via attachment procedures configured to operate as a fire-resister or fire-blocker, to be rated to pass flame requirement tests for aircraft cabin interior installations (e.g., structures or components) such as seat cushions as set forth by the aviation guidelines and/or standards under 14 C.F.R. Part 25 and its Appendices (e.g., 14 C.F.R. § 25.853, also found in FAA Advisory Circular (AC) 25.853-1), or the like.

In another embodiment, the one or more sections may be configured to fit over a cushion 102. The cushion 102 may be a single component or a combination of a primary component and one or more auxiliary components. For example, as illustrated in FIG. 1A, the cushion 102 may include a single component. For instance, the single component may include, but is not limited to, a foam cushion. By way of another example, as illustrated in FIG. 1B, the cushion 102 may include a primary component and two auxiliary components. For instance, the primary component may include a main cushion and the two auxiliary components may include an airbag or air bladder system 102a and a cushion extension 102b. In addition, the primary component may include a main cushion and the two auxiliary components may include a cushion extension 102c rotatable about an axis via a cam assembly 102d.

In another embodiment, the dress cover 100 may be installed when the cushion 102 is in a retracted position or state, which may allow for the dress cover 100 to keep taut following any change in cover length caused by an extension of the cushion 102 (and subsequent retraction to return). It is noted herein, however, the dress cover 100 may be dimensioned to be installed on the cushion 102 when the cushion 102 is in a partially-extended or fully-extended position or state.

In another embodiment, the dress cover 100 may wrap around one or more edges, side surfaces, and/or bottom surface of the cushion 102 (and/or auxiliary components 102a, 102b, 102c, 102d) to secure the dress cover 100 to the cushion 102. For example, the wrap-around nature of the dress cover 100 may assist in keeping the dress cover 100 taut.

It is noted herein the expandable section of the dress cover and/or the wrap-around nature of the dress cover 100 resulting in the tautness of the dress cover 100 may keep a side profile of the dress cover 100 smooth (e.g., without wrinkles, pinched locations, folds, creases, or the like), preventing the observing of changes in profile of the cushion 102 (and/or the auxiliary components 102a, 102b, 102c, 102d), where the side profile is observable when an aircraft seat including the cushion 102 (e.g., aircraft seat 300, as described throughout the present disclosure) is in a lie-flat or bed position. For example, the resultant tautness may prevent the observing of the expansion of the foam cushion 102, the airbag or air bladder system 102a being inflated or deflated to move the cushion extension 102b, the rotation of the cushion extension 102c, or the like.

It is noted herein at least one section top surface length of the one or more sections may depend on a number of factors including, but not limited to, a difference in length an aircraft seat pan including the cushion 102 (e.g., seat pan 302, as described throughout the present disclosure) may change from a retracted position or state to a partially-extended or fully-extended position or state, an amount or percentage of stretch in a material capable of expansion and/or compression from which one or more sections may be fabricated, or the like.

In one non-limiting example, the dress cover 100 may be manufactured from a first section 104, a second section 106, and a third section 108. The first section 104 and the second section 106 may be sewn together at a seam 110, and the second section 106 and the third section 108 may be sewn together at a seam 112. It is noted herein the seams 110, 112 may be visible or may be hidden (e.g., non-accessible when the dress cover 100 is installed on the cushion 102).

The first section 104 and the third section 108 may be fabricated from a same type and/or pattern of material, and the second section 106 may be fabricated from a different type and/or pattern of material. For example, the first section 104 and the third section 108 may be fabricated from a same material that is non-expandable and/or non-compressible (e.g., beyond the natural movement of the material structure or fabric weave). By way of another example, the second section 106 may be fabricated from a material that is capable of expansion (e.g., through stretching) and/or compression.

It is noted herein the first section 104 and the third section 108 being fabricated from the same material may allow for a design on the dress cover 100. For example, the design may be related to a vehicle brand or trim package (e.g., an airplane, an automobile, a boat, or the like), a vehicle manufacturer, a vehicle service provider (e.g., an airline, or the like), or be related to another type of marking with which a fabric may be printed or arranged in a pattern with other pieces of fabric. In addition, it is noted herein the first section 104, the second section 106, and the third section 108 being fabricated from the same material may allow for a fully uniform design on the dress cover 100.

The dress cover 100 may be dimensioned with a cover top surface length 114, which may be separated into sections of length. For example, the first section 104 being dimensioned with a first section top surface length 116, the second section 106 being dimensioned with a second section top surface length 118, and the third section 108 being dimensioned with a third section top surface length 120.

The second section top surface length 118 may be fabricated from a material that is capable of expansion (e.g., via stretching) and/or compression. The second section top surface length 118 may be dependent on an amount or percentage of stretch in the material capable of expansion and/or compression from which the second section 106 is fabricated. For example, the second section 106 being fabricated from a material that is capable of expanding and/or compressing may allow for the dress cover 100 to accommodate different lengths of aircraft seat extension and/or retraction. For example, the dress cover 100 may be dimensioned with a cover top surface length 114 for being installed on the cushion 102 when the cushion 102 is in a retracted position or state, which may allow for the second section 106 to keep taut for any change in cover length caused by an extension of the cushion 102. It is noted herein, however, the dress cover 100 may be dimensioned with a cover top surface length 114 for being installed on the cushion 102 when the cushion 102 is in a partially-extended or fully-extended position or state.

Figure 2A:
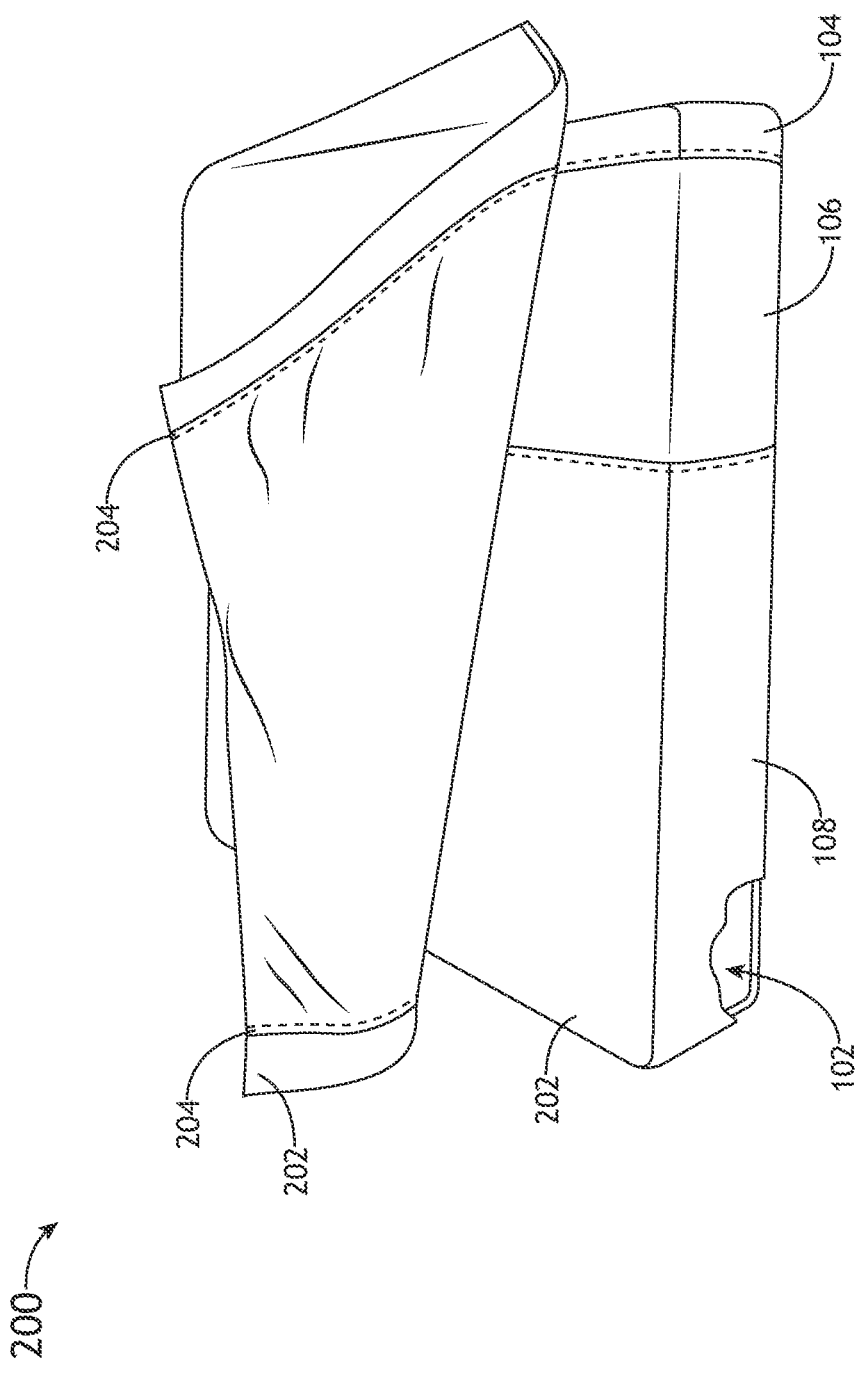
FIG. 2A illustrates a perspective view of an extendable cushion including a dress cover, in accordance with one or more embodiments of the disclosure.
Figure 2C:
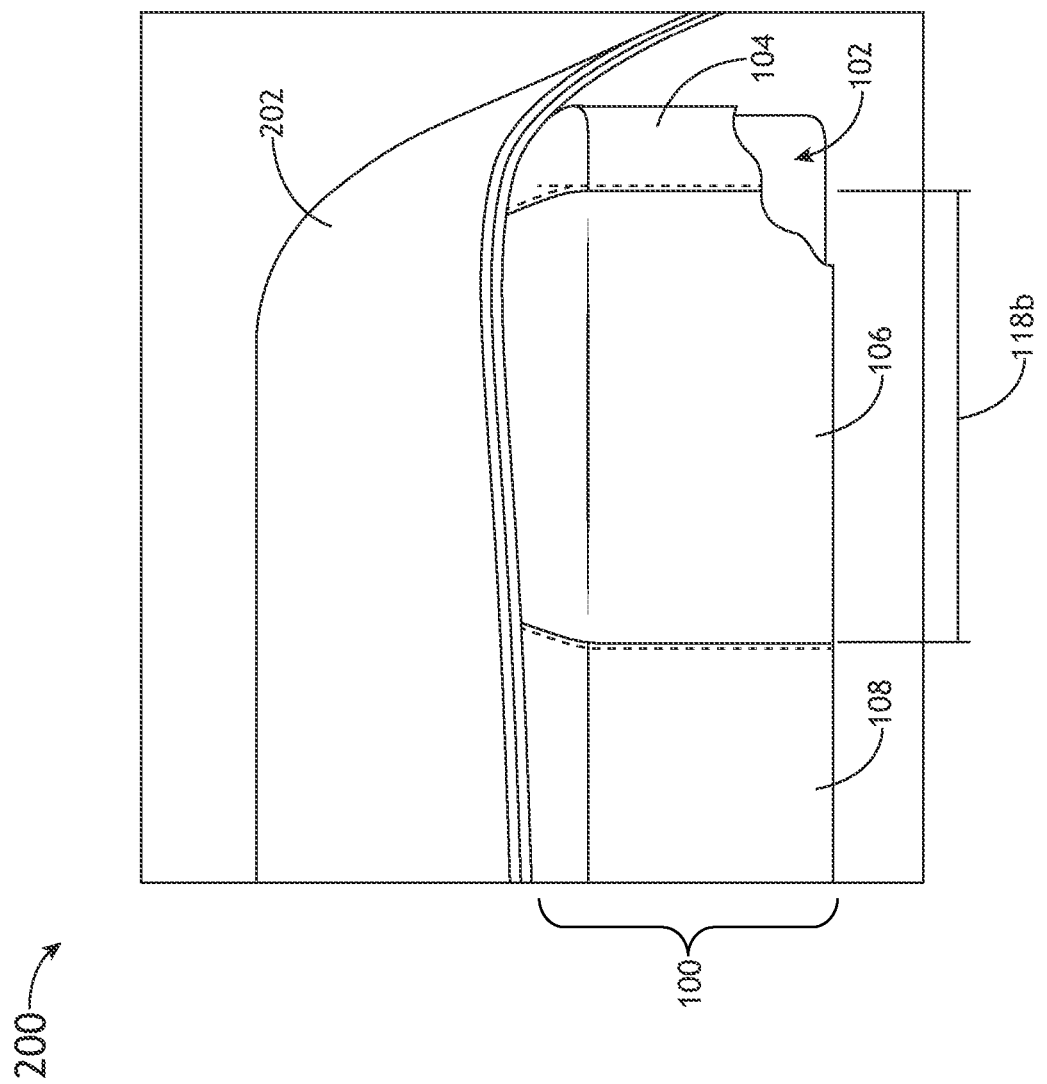
FIG. 2C illustrates a side-profile view of portions of an extendable cushion including a dress cover, in accordance with one or more embodiments of the disclosure.

FIGS. 2A-2C illustrates a dress cover system 200, in accordance with one or more embodiments of the present disclosure.

In one embodiment, the dress cover system 200 includes a removable cover 202 and the dress cover 100 over the cushion 102. It is noted herein the removable cover 202 may protect the dress cover 100, providing a more easily-swappable component to the aircraft seat if the removable cover 202 gets damaged, as opposed to changing the dress cover 100 (e.g., with or without needing to change the cushion 102) if the dress cover 100 gets damaged.

In another embodiment, the removable cover 202 is manufactured from one or more sections. In general, the removable cover 202 may be fabricated from 1, 2 . . . up to an N number of sections. Where there are multiple sections, each section has a section top surface length that forms a percentage of a cover top surface length of the removable cover 202. Where there are multiple sections, adjacent sections may be joined together. For example, the adjacent sections may be joined together via sewing, a fabric adhesive, or the like. For instance, adjacent sections may be joined together at one or more seams 204.

Although a joining location is illustrated in FIGS. 2A-2C, it is noted herein the joining location is shown only for purposes of clarity and that the joining location may be hidden on the dress cover 100 and/or the removable cover 202 (e.g., non-accessible when the dress cover 100 is installed on the cushion 102) for purposes of preventing access to the joining location, cleanliness of design, meeting aviation guidelines and/or standards, or the like.

In another embodiment, the one or more sections of the removable cover 202 may be fabricated from a same type and/or pattern of material or a different type and/or pattern of material. For example, at least some of the sections of the removable cover 202 may be fabricated from different types of material. By way of another example, all sections of the removable cover 202 may be fabricated from a different type and/or pattern of material. By way of another example, all sections of the removable cover 202 may be fabricated from a same type and/or pattern of material. The one or more sections of the removable cover 202 may be fabricated from a material that is non-expandable and/or non-compressible (e.g., beyond the natural movement of the material structure or fabric weave). The one or more sections of the removable cover 202 may be fabricated from a material that is capable of expansion (e.g., via stretching) and/or compression.

Where the removable cover 202 is installed on an aircraft seat (e.g., aircraft seat 300, as described throughout the present disclosure), the type (or types) of material from which the one or more sections of the removable cover 202 may be fabricated are configured to meet aviation guidelines and/or standards. For example, the removable cover 202 may be rated to pass flame requirement tests for aircraft cabin interior installations (e.g., structures or components) such as seat cushions as set forth by the aviation guidelines and/or standards under 14 C.F.R. Part 25 and its Appendices (e.g., 14 C.F.R. § 25.853, also found in FAA Advisory Circular (AC) 25.853-1), or the like. For instance, where the removable cover 202 includes multiple sections, the multiple sections may be joined together via attachment procedures configured to operate as a fire-resister or fire-blocker, to be rated to pass flame requirement tests for aircraft cabin interior installations (e.g., structures or components) such as seat cushions as set forth by the aviation guidelines and/or standards under 14 C.F.R. Part 25 and its Appendices (e.g., 14 C.F.R. § 25.853, also found in FAA Advisory Circular (AC) 25.853-1), or the like.

In another embodiment, at least some of the one or more sections of the dress cover 100 and at least some of the one or more sections of the removable cover 202 may be fabricated from a same type and/or pattern of material or a different type and/or pattern of material. For example, the one or more sections of the removable cover 202 may be fabricated from the same material as the first section 104 and the third section 108 of the dress cover 100.

It is noted herein fabricating at least some of the one or more sections of the dress cover 100 and the one or more section of the removable cover 202 from a same type and/or pattern of material may allow for a matching, overlapping, or shared design on the dress cover 100 and the removable cover 202. For example, the design may be related to a vehicle brand or trim package (e.g., an airplane, an automobile, a boat, or the like), a vehicle manufacturer, a vehicle service provider (e.g., an airline, or the like), or be related to another type of marking with which a fabric may be printed or arranged in a pattern with other pieces of fabric.

In another embodiment, the removable cover 202 is coupled to one or more ends or surfaces to the dress cover 100. For example, the removable cover 202 may be fixed via fasteners, an interlocking assembly (e.g., a hook-and-loop assembly, a tab-and-groove assembly, or the like).

In another embodiment, the removable cover 202 is coupled to a component of a seat (e.g., aircraft seat 300, as described throughout the present disclosure) proximate to the dress cover 100 (e.g., a single or dual roll-blind system, or the like). For example, the removable cover 202 may be longer than the cover top surface length of the dress cover 100. For example, the removable cover 202 may hang over one or multiple ends of the dress cover 100. For instance, the removable cover 202 may hang over one or multiple ends of the dress cover 100 and may be fixed to components of the aircraft seat proximate to the cushion 102 (e.g., to prevent the removable cover 202 from sliding when the aircraft seat is occupied, being occupied, or being unoccupied).

In another embodiment, the dress cover 100 and the cushion 102 may slide under the removable cover 202 when the cushion 102 actuates (e.g., extends or retracts) between a retracted position or state and one or more extended positions or states. For example, as illustrated in FIG. 2B, the second section 106 of the dress cover 100 may have a second section top surface length 118a when the cushion 102 is in a retracted position or state. By way of another example, as illustrated in FIG. 2C, the second section 106 of the dress cover 100 may have a second section top surface length 118b when the cushion 102 is in an extended position or state (e.g., of one or more extended positions or states).

For instance, the second section top surface length 118b is longer than the second section top surface length 118a.

In another embodiment, the first section top surface length 116 of the first section 104 and the third section top surface length 120 of the third section 108 may see no change or a negligible change when the second section 106 transitions between the second section top surface 118a and the second section top surface 118b, due to the difference in properties of the material (or materials) from which the first section 104 and the third section 108 are fabricated as compared to the second section 106. In this regard, the second section 106 may be a source for most or all of the expansion and/or compression of the dress cover 100.

It is noted herein, however, the first section top surface length 116 of the first section 104 and the third section top surface length 120 of the third section 108 may also see a change in length when the second section 106 transitions, due to a similarity in properties of the material (or materials) from which the first section 104, the second section 106, and the third section 108 are fabricated. In this regard, the first section 104, the second section 106, and the third section 108 may each contribute to the expansion and/or compression of the dress cover 100.

In both FIGS. 2B and 2C, the removable cover 202 remains atop the dress cover 100 and the cushion 102. As seen from the side profile views in FIGS. 2B and 2C, the dress cover 100 retains its shape despite the change in length 118a versus 118b of the second section top surface length 118, preventing an improper fit or interface that would otherwise be messier, have more lines, and include more gaps between sections of the cushion 102.

Figure 3B:
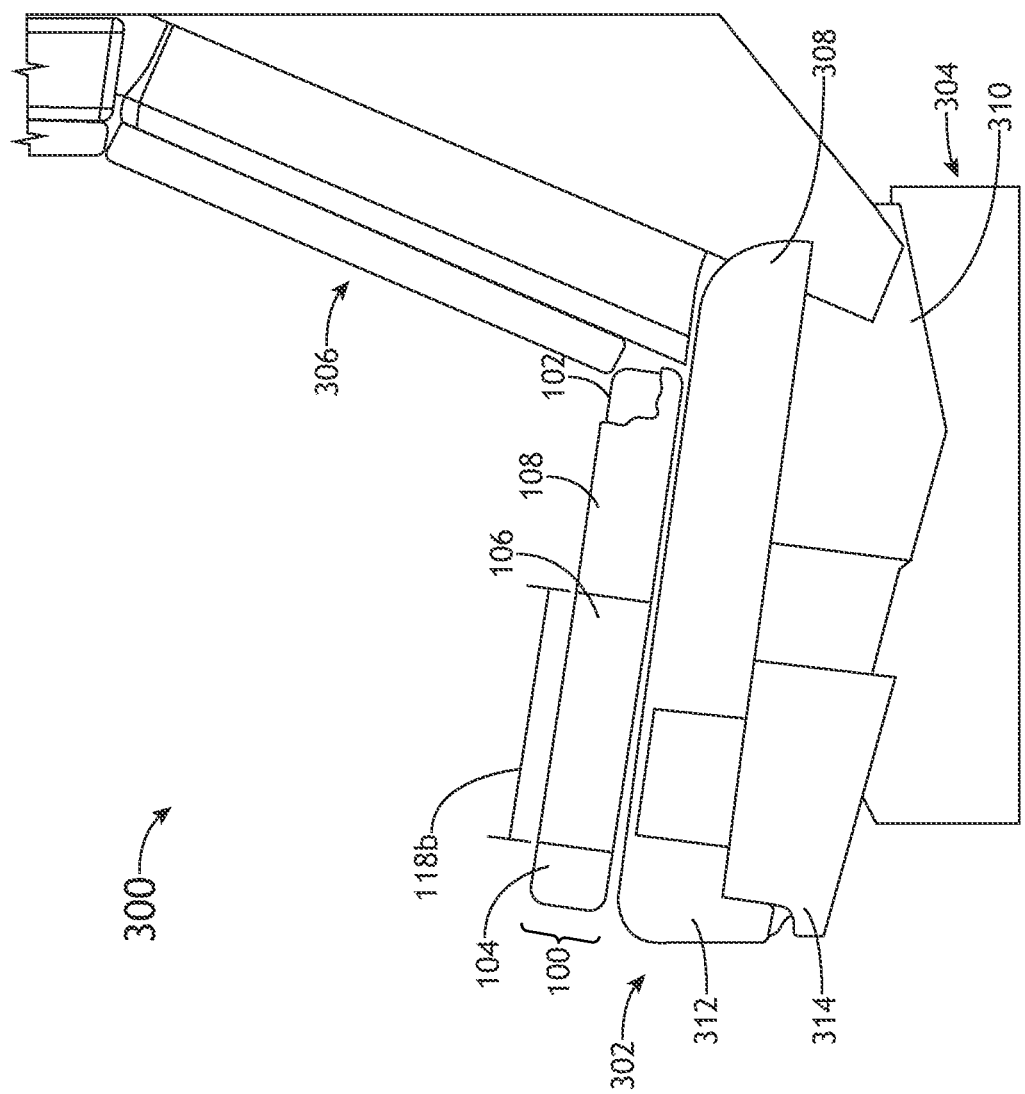
FIG. 3B illustrates a side-profile view of an aircraft seat including an extendable cushion with a dress cover, in accordance with one or more embodiments of the disclosure.
Figure 4A:
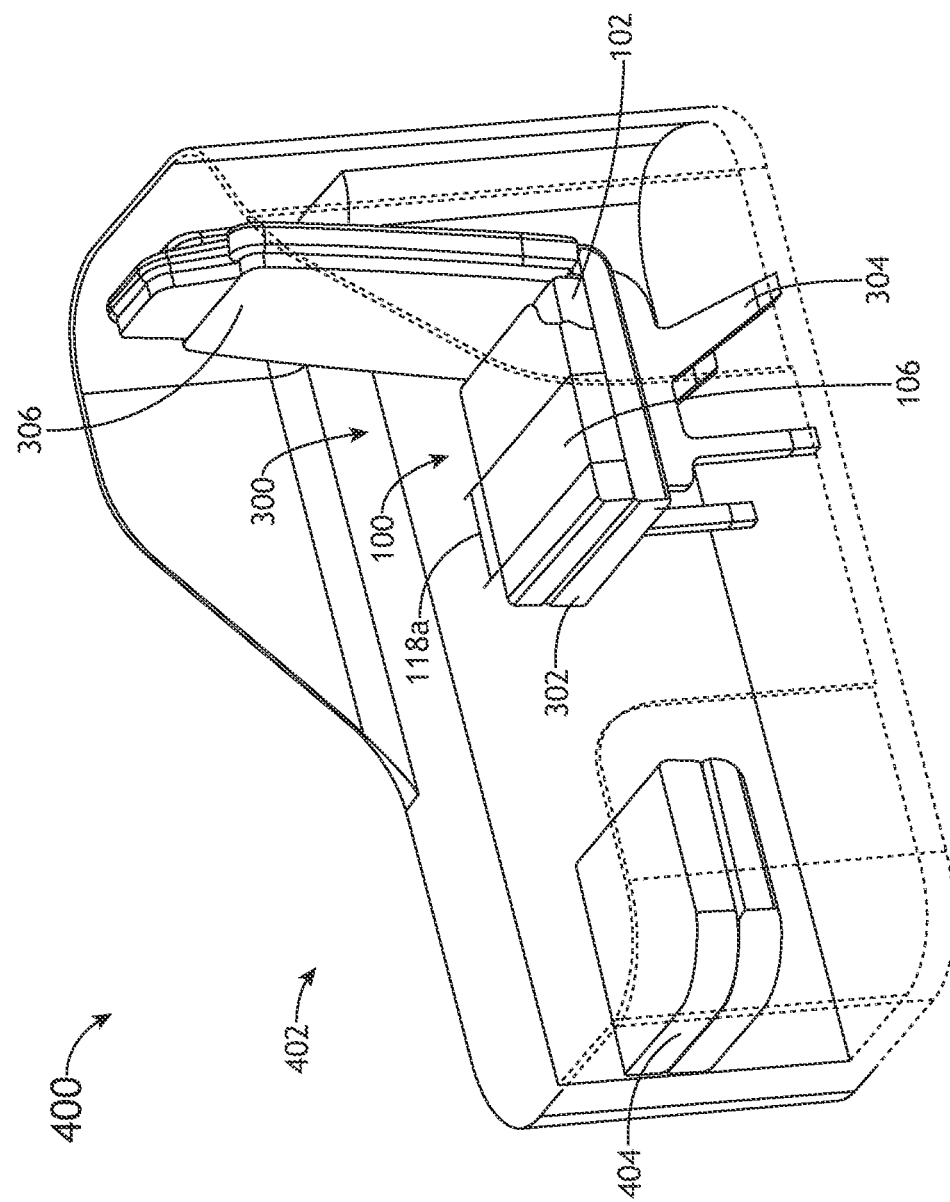
FIG. 4A illustrates a perspective view of a passenger compartment including an aircraft seat with an extendable cushion and a dress cover, in accordance with one or more embodiments of the disclosure.
Figure 4B:
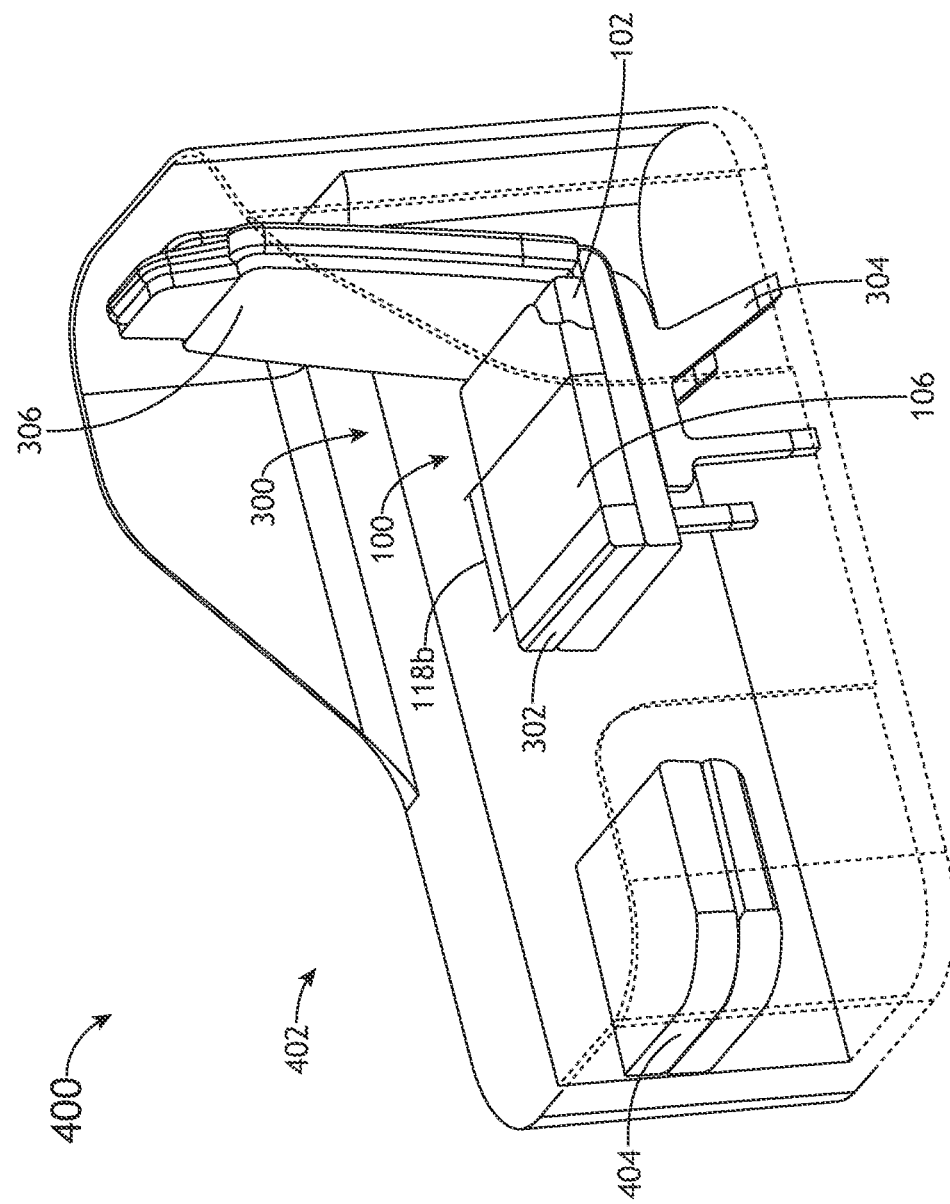
FIG. 4B illustrates a perspective view of a passenger compartment including an aircraft seat with an extendable cushion and a dress cover, in accordance with one or more embodiments of the disclosure.
Figure 4C:
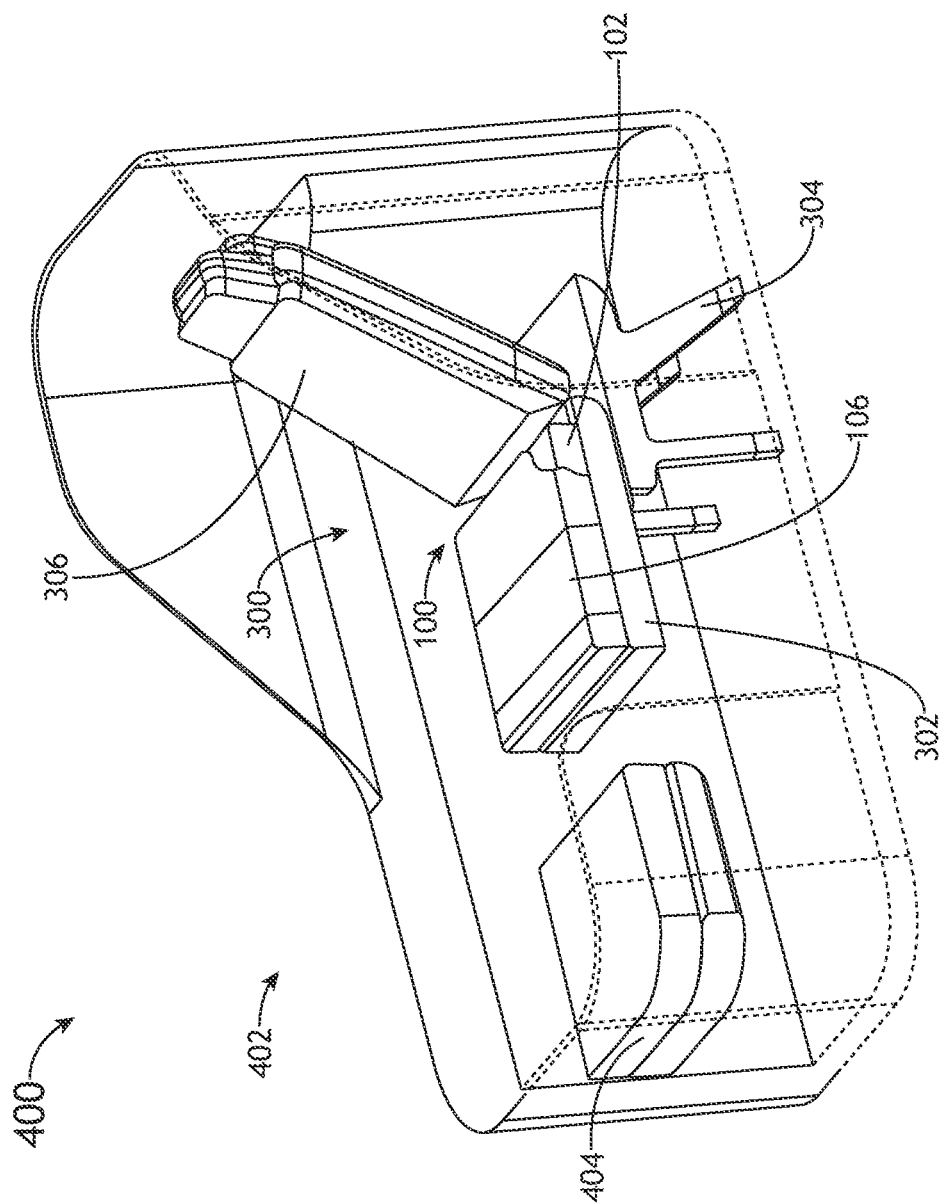
FIG. 4C illustrates a perspective view of a passenger compartment including an aircraft seat with an extendable cushion and a dress cover, in accordance with one or more embodiments of the disclosure.
Figure 4D:
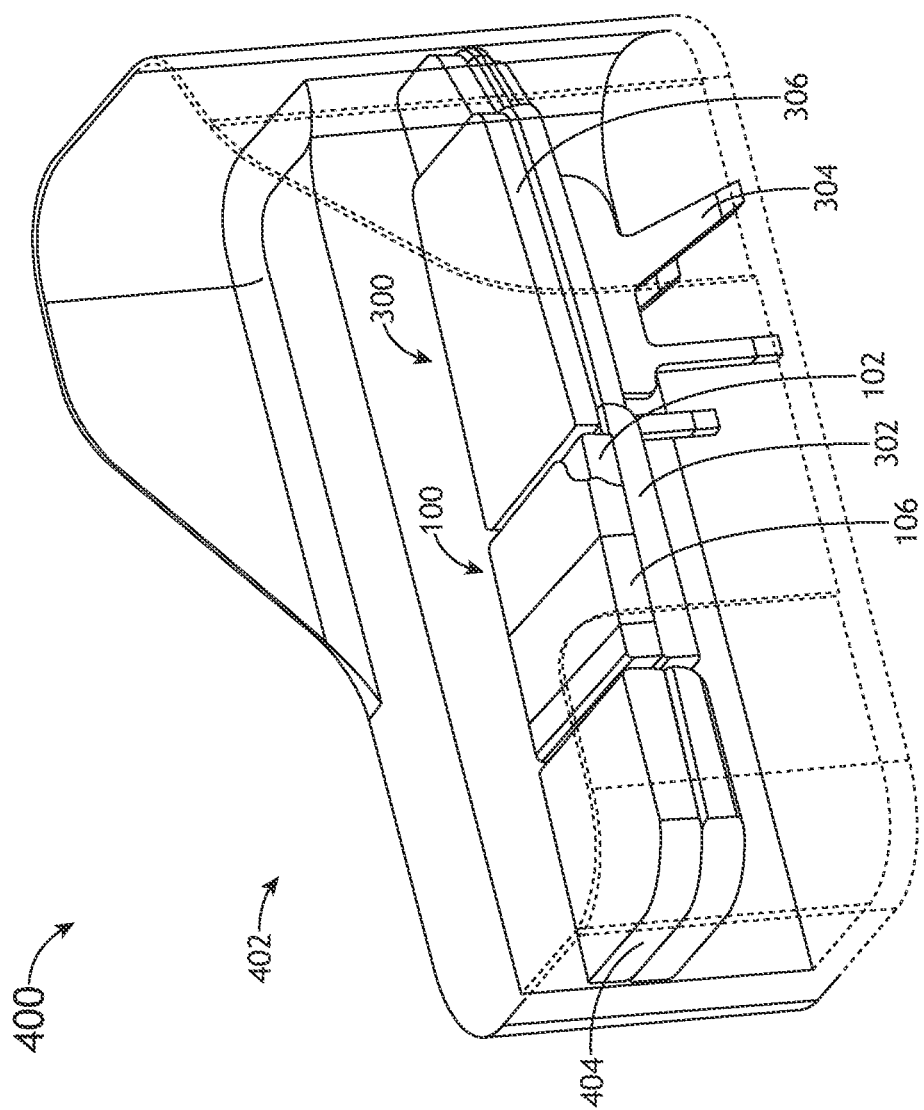
FIG. 4D illustrates a perspective view of a passenger compartment including an aircraft seat with an extendable cushion and a dress cover, in accordance with one or more embodiments of the disclosure.

FIGS. 3A and 3B illustrate portions of an aircraft seat 300, in accordance with one or more embodiments of the present disclosure. It is noted herein the dress cover 100 and the cushion 102 should be configured in accordance with aviation guidelines and/or standards when installed on the aircraft seat 300.

In another embodiment, the aircraft seat 300 includes a seat pan 302, a seat base 304, and a seat back 306. For example, the seat back 306 may include an integrated headrest or a coupling point for a separate installable headrest. It is noted herein the removable cover 202 may couple to the seat base 304 and/or the seat back 306, or to components coupled to the seat base 304 and/or the seat back 306.

In another embodiment, additional components may couple to and/or be integrated into the one or more aircraft seats 300 including, but not limited to, pivoting armrests, aircraft seatbelts, tray table support arms, or the like. It is noted herein the seat base 304 may attach to the one or more structural beams and secure to embedded aircraft seat tracks located in a floor of the aircraft cabin 400 via conventional track fasteners.

In another embodiment, the seat pan 302 includes a seat pan primary section 308 and the seat base 304 includes a seat base primary section 310. For example, the seat pan primary section 308 and the seat base primary section 310 may be separate or may be coupled together. For instance, the seat pan primary section 308 and the seat base primary section 310 may be configured to actuate together if coupled together.

In another embodiment, the seat pan 302 includes a seat pan extender 312 and the seat base 304 includes a seat base extender 314. For example, the seat pan extender 312 and the seat base extender 314 may be separate or may be coupled together. For instance, the seat pan extender 312 and the seat base extender 314 may be configured to actuate together if coupled together. By way of another example, the seat pan extender 312 may actuate relative to the seat pan primary section 308, and the seat base extender 314 may actuate relative to the seat base primary section 310.

It is noted herein the seat pan extender 312 being in an extended position or state may cause a void or cavity to form between the seat pan primary section 308 and the seat pan extender 312. In addition, it is noted herein the seat pan 302 may include an actuatable cover or plate (e.g., fabricated a rigid or flexible material) configured to prevent access to the formed void or cavity (e.g., coupled to the seat pan extender 312 and actuatable with the seat pan extender 312, or the like).

In another embodiment, the seat pan 302 supports the cushion 102 and the dress cover 100 (or the dress cover system 200, where the removable cover 202 is installed on the dress cover 100 and the cushion 102). In another embodiment, the second section 106 may be the second section top length 118a when the seat pan 302 is in a retracted position or state. In another embodiment, the second section 106 may be the second section top length 118b when the seat pan 302 is in an extended position or state.

In another embodiment, the cushion 102 may conform or substantially conform to the aircraft seat 300. For example, at least one surface of the cushion 102 may conform to a corresponding surface of the aircraft seat 300. By way of another example, components of the aircraft seat 300 may extend beyond the boundaries of the cushion 102, such that the at least one surface of the cushion 102 does not fully conform to the corresponding surface of the aircraft seat 300. By way of another example, a portion of the cushion 102 may wrap around or otherwise enclose a portion of the aircraft seat 300 (e.g., including, but not limited to, a front edge or leading portion of the cushion 102). In another embodiment, the cushion 102 may conform to a portion of a user (e.g., a passenger, a crew member, or the like).

In another embodiment, the cushion 102, the dress cover 100, and/or the removable cover 202 may be attached to one or more components of the aircraft seat 300. For example, the one or more components may include, but not limited to, a diaphragm. By way of another example, the cushion 102, the dress cover 100, and/or the removable cover 202 and the one or more components of the aircraft seat 300 may be coupled with hook and loop fastener assemblies (e.g., Velcro®) or other fastener assemblies (e.g., attachment clips, or the like).

FIGS. 4A-4D illustrate an aircraft cabin 400, in accordance with one or more embodiments of the present disclosure.

In one embodiment, the one or more aircraft seats 300 may be independently-positioned within the aircraft cabin 400. For example, the aircraft seat 300 may include, but is not limited to, a business class or first-class passenger aircraft seat, an economy-class passenger aircraft seat, or the like. It is noted herein the terms "aircraft seats" and "passenger aircraft seats" may be considered equivalent, for purposes of the disclosure.

In another embodiment, the one or more aircraft seats 300 may be coupled together via one or more frames or frame elements such as structural beams. For example, the one or more aircraft seats 300 may be within a row of aircraft seats 300 coupled to a set of structural beams, where select aircraft seat 300 components may be shared with other aircraft seats 300. For instance, some frame elements may be shared between adjacent aircraft seats 300 while other frame elements may be common across an entire row of aircraft seats 300. In addition, the one or more aircraft seats 300 may be part of a two-aircraft seat, three-aircraft seat, four-aircraft seat, or five or more-aircraft seat row.

In another embodiment, the cabin 400 may include a passenger compartment 402. The passenger compartment 402 may include a privacy shell with one or more privacy shell elements. The privacy shell may include an opening within the one or more privacy shell elements into the passenger compartment 402. The passenger compartment 402 may include a door for the opening. For example, the door may swing or slide into an open position against a privacy shell element. By way of another example, a privacy shell element may be at least partially hollow, and the door may be slid into a cavity defined in the one or more privacy shell elements.

The passenger compartment 402 may include one or more monuments. For example, the monument may include, but is not limited to, a side stand, a tray or table, or the like. Where the monument includes a tray or table, the tray or table may include a top surface, a bottom surface, and/or one or more side surfaces. For example, the tray may include a single continuous side surface where all corners are rounded. By way of another example, the tray may include up to an N number of side surfaces where the tray includes up to an N number of corners. The tray or table may be fixed in position. It is noted herein, however, that the tray or table may be actuatable (e.g., may extend a select distance from a stowed position to an extended position proximate to a passenger). The aircraft seat 300 may be configured to avoid contact with the one or more monuments when transitioning between positions (e.g., between the upright or raised position and the lie-flat or bed position).

At least a portion of the passenger compartment 402 (e.g., at least a portion of the privacy shell, a monument of the one or more monuments, or the like) may conform to a portion of the aircraft seat 300. In this regard, the amount of aircraft cabin floor space necessary for the passenger compartment 402 may be reduced.

In another embodiment, where the aircraft seat 300 is an actuatable aircraft seat, the aircraft seat 300 may be rotatable about an axis (e.g., swivelable). The aircraft seat 300 may be fully positionable between the outer limits of motion as defined by the moveable components of the aircraft seat 300. Where the aircraft seat 300 is installed within a passenger compartment 402, the aircraft seat 300 may be fully positionable between the outer limits of motion as defined by one or more monuments of the passenger compartment 402. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 300 may be actuatable (e.g., translatable and/or rotatable) from the TTOL position to a non-TTOL position, and/or vice versa. Further, it is noted herein the aircraft seat 300 may be capable of a fully upright or raised position, and that the TTOL position may have a more reclined aircraft seat back cushion and a more angled upward aircraft seat pan cushion as compared to the fully upright or raised position. Therefore, the above description should not be interpreted as a limitation on the present disclosure but merely an illustration.

In general, an aircraft seat 300 may be translatable (e.g., trackable or slidable). The aircraft seat 300 may be rotatable about an axis cross-wise through the aircraft seat 300 into a position including, but not limited to, the upright or raised position, one or more lounge or reclined positions, and a lie-flat or bed position. For example, the aircraft seat 300 may transition directly between the upright or raised position and the lie-flat or bed position. By way of another example, it is noted herein the aircraft seat 300 may transition through one or more lounge or reclined positions between the upright or raised position and the lie-flat or bed position. By way of another example, the aircraft seat 300 may transition into one or more lounge or reclined positions in a motion separate from the transition between the upright or raised position and the lie-flat or bed position. Therefore, the above description should not be interpreted as a limitation on the scope of the disclosure but merely an illustration.

In another embodiment, the cabin 400 includes an ottoman 404. The aircraft seat 300 may be proximate to an ottoman 404. For example, the aircraft seat 300 and the ottoman 404 may form the lie-flat surface when the aircraft seat 300 and the ottoman 404 are each in a lie-flat or bed position.

The ottoman 404 may be positioned underneath and/or proximate to at least some of the one or more monuments of the passenger compartment 402. The ottoman 404 may be positioned within a footwell of the passenger compartment 402. For instance, one or more dimensions of the footwell may be changed by transitioning the aircraft seat 300 between the upright or raised position, a lounge or reclined position, and/or the lie-flat or bed position. It is noted herein that a portion of the ottoman 404 may be actuatable (e.g., along a set of tracks or linear rails) to a position outside of the footwell.

The ottoman 404 may be configured to translate and/or rotate about an axis through a sidewall of the ottoman to cause a top surface to face a passenger occupying the aircraft seat 300. For example, where the ottoman 404 may be configured to both translate and rotate, the ottoman 404 may be configured to independently rotate and/or translate. By way of another example, where the ottoman 404 may be configured to both translate and rotate, a rotation may prevent further translation until the ottoman 404 is returned to a select position and/or a translation may prevent further rotation until the ottoman 404 is returned to a select position.

It is noted herein, however, the aircraft seat 300 and/or the ottoman 404 may be limited to an upright or raised position and/or one or more lounge or reclined positions. In addition, it is noted herein the aircraft seat 300 may be the sole component forming a bed when the aircraft seat 300 is in a lie-flat or bed position. Therefore, the above description should not be interpreted as a limitation on the present disclosure but merely an illustration.

In another embodiment, the cushion 102 may be in a retracted position or state or one or more extended positions or states when the aircraft seat 300 is in the upright or raised position, a lounge or reclined position, and/or the lie-flat or bed position. For example, the cushion 102 may be in an extended position or state when the aircraft seat 300 is in the lie-flat or bed position, such that the cushion 102 comes into contact and/or there is a narrow enough gap to prevent items from falling between the cushion 102 and the ottoman 404 when the aircraft seat 300 is in the lie-flat or bed position. For instance, the aircraft seat 300 may be configured to actuate with the cushion 102 in the extended position or state into or out of the lie-flat or bed position. In addition, the aircraft seat 300 may be configured to actuate with the cushion 102 in the retracted position or state into or out of the lie-flat or bed position, and the cushion 102 may be configured to actuate between the extended position or state and the retracted position or state when the aircraft seat 300 is in the lie-flat or bed position.

In another embodiment, the cushion 102 may be in a retracted position or state or one or more extended positions or state when the aircraft seat 300 is in the upright or raised position, but may be in a retracted position or state in a lounge or reclined position and/or the lie-flat or bed position. For example, the cushion 102 may in an extended position or state when the aircraft seat 300 is in the upright or raised position, but may be required to retract prior to the aircraft seat 300 actuating between the upright or raised position, a lounge or reclined position, and/or the lie-flat or bed position. For instance, the cushion 102 may be in a retracted position or state when the aircraft seat 300 is in the lie-flat or bed position, such that the cushion 102 comes into contact and/or there is a narrow enough gap to prevent items from falling between the cushion 102 and the ottoman 404 when the aircraft seat 300 is in the lie-flat or bed position.

Although embodiments of the disclosure illustrate the dress cover 100 being usable with the aircraft seat 300, it is noted herein, however, that the dress cover 100 is not limited to the aviation environment and/or the aircraft components within the aviation environment. For example, the dress cover 100 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the dress cover 100 may be configured for commercial or industrial use in either a home or a business. Therefore, the above description should not be interpreted as a limitation on the present disclosure but merely an illustration.

As such, advantages of the present disclosure are directed to a dress cover 100 for an extendable cushion 102. Advantages of the present disclosure are also directed to installing the dress cover 100 on the cushion 102. Advantages of the present disclosure are also directed to the dress cover 100 being capable of expanding or compressing with the movement of the cushion 102. Advantages of the present disclosure are also directed to the dress cover 100 being protected by a secondary, removable cover 202.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:
1. A dress cover for an extendable cushion, comprising:
   a first section and at least a second section, the at least a second section including a second section and a third section, the first section being positioned between the second and the third second, the first section being fabricated from a first, expandable material and the at least a second section being fabricated from at least a second material, the at least a second material being at least one non-expandable material, the first section including a compressed top surface length when the extendable cushion is in a retracted state, the first section including an expanded top surface length when the extendable cushion is in an extended state, the expanded top surface length being greater than the compressed top surface length, the dress cover configured to have a smooth side profile when the extendable cushion is in either of the retracted state or the extended state, the side profile of the dress cover being viewable when an aircraft seat including the extendable cushion with the dress cover is in a lie-flat or bed position.

2. The dress cover of claim 1, the dress cover being configured to retain the smooth side profile when the extendable cushion transitions between the retracted state and the extended state.

3. The dress cover of claim 1, the second section being fabricated from a first non-expandable material and the third section being fabricated from a second, different non-expandable material.

4. The dress cover of claim 1, the non-expandable material from which the second section and the third section are fabricated being the same.

5. The dress cover of claim 1, the first, expandable material and the at least a second material of the dress cover being rated to pass flame tests for aircraft cabin interior installations as set forth by aviation guidelines or standards.

6. The dress cover of claim 1, the first section and the at least a second section being joined together via a seam produced with one or more attachment procedures, the attachment procedures being rated to pass flame tests for aircraft cabin interior installations as set forth by aviation guidelines or standards.

7. The dress cover of claim 6, the seam being non-accessible when the dress cover is installed on the extendable cushion.

8. The dress cover of claim 7, the dress cover being configured to wrap-around at least one of an edge, side surface, or bottom surface of the extendable cushion when installed on the extendable cushion.

9. The dress cover of claim 8, the dress cover being installed on the extendable cushion when the extendable cushion is in the retracted state.

10. The dress cover of claim 1, a top surface of the dress cover being protected by a removable cover, the removable cover including at least one section fabricated from at least one material, the at least one material of the at least one section of the removable cover being rated to pass flame tests for aircraft cabin interior installations as set forth by aviation guidelines or standards.

11. The dress cover of claim 1, the extendable cushion positioned on a seat pan of the aircraft seat, the extendable cushion configured to actuate with a section of the seat pan.

12. An aircraft seat, comprising:

a seat pan;

an extendable cushion positioned on the seat pan, the extendable cushion being configured to actuate with at least a section of the seat pan; and a dress cover installed on the extendable cushion; the dress cover comprising:

a first section and at least a second section, the at least a second section including a second section and a third section, the first section being positioned between the second and the third second, the first section fabricated from a first, expandable material and the at least a second section fabricated from at least a second material, the at least a second material being at least one non-expandable material, the first section including a compressed top surface length when the extendable cushion is in a retracted state, the first section including an expanded top surface length when the extendable cushion is in an extended state, the expanded top surface length being greater than the compressed top surface length, the dress cover configured to have a smooth side profile when the extendable cushion is in either of the retracted state or the extended state, the side profile of the dress cover being viewable when the aircraft seat is in a lie-flat or bed position.

\* \* \* \* \*